United States Patent [19]

Kadosawa

[11] Patent Number: 4,767,974
[45] Date of Patent: Aug. 30, 1988

[54] AUTOMATIC UNIVERSAL HEAD

[75] Inventor: Tsuneaki Kadosawa, Ninomiya, Japan

[73] Assignee: Canon Kabushiki Kaisha, Tokyo, Japan

[21] Appl. No.: 897,426

[22] Filed: Aug. 18, 1986

[30] Foreign Application Priority Data

Aug. 29, 1985 [JP] Japan .................................. 60-190473

[51] Int. Cl.⁴ ................................................ G05B 1/06
[52] U.S. Cl. .................................. 318/663; 318/445; 318/563
[58] Field of Search ............... 318/445, 452, 449, 663, 318/565, 563; 361/23, 28, 29

[56] References Cited

U.S. PATENT DOCUMENTS 4,005,585  2/1977  Matthews ........................ 318/452 X
4,323,827  4/1982  Young ............................. 318/452 X
4,609,868  9/1986  Ferrari ............................. 361/23 X Primary Examiner—Bentsu Ro
Attorney, Agent, or Firm—Fitzpatrick, Cella, Harper & Scinto

[57] ABSTRACT

This invention relates to an automatic universal head for operating a motor on the basis of set information and automatically controlling the controlled mode of the universal head to a state conforming to the set information. In this invention, when the universal head control based on the set information is not executed for some reason or other, the power supply to the motor is automatically inhibited in a predetermined time after the universal head control is started.

1 Claim, 2 Drawing Sheets

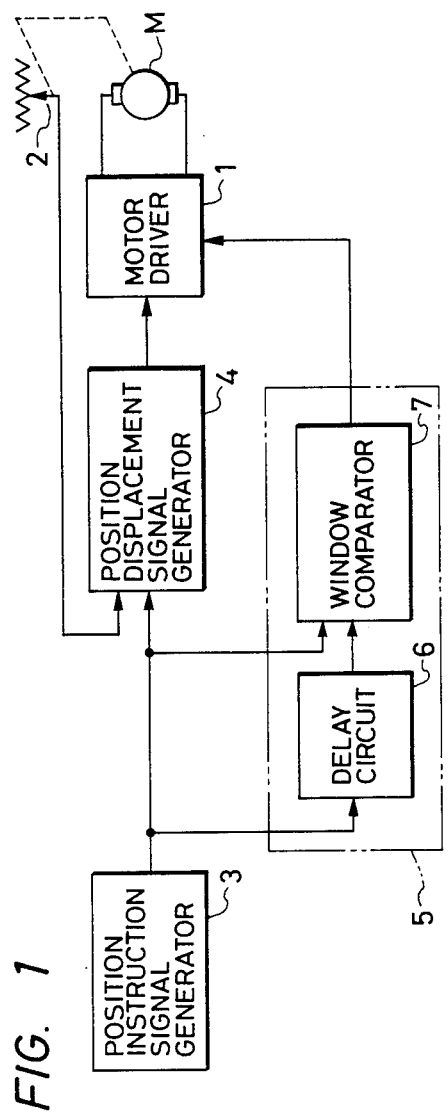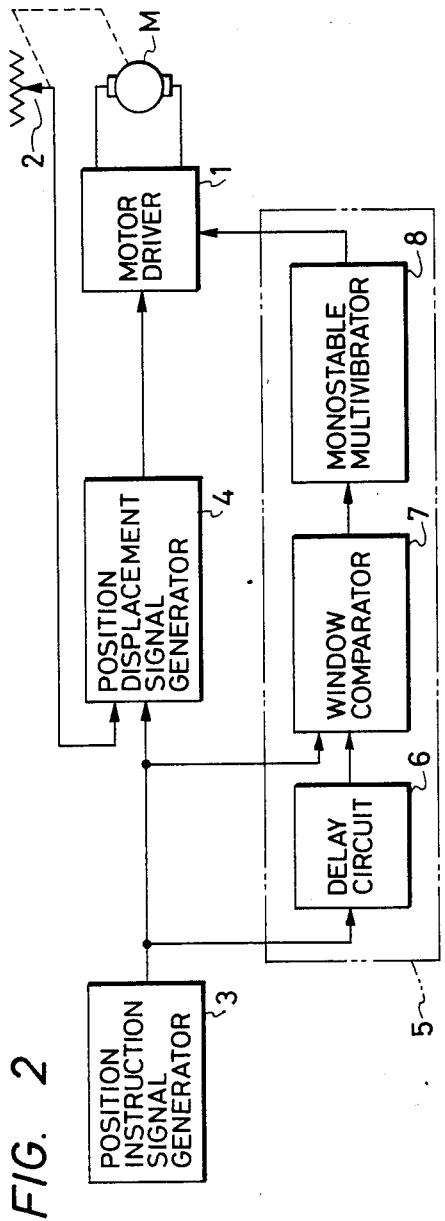
FIG. 1
FIG. 2

AUTOMATIC UNIVERSAL HEAD

BACKGROUND OF THE INVENTION

1. Field of the Invention

This invention relates to an automatic universal head which supports a camera or the like and can automatically rotate the camera or the like in any direction by remote operation and can position the camera or the like as desired, and more particularly to an automatic universal head improved in the control circuit thereof.

2. Related Background Art

An automatic universal head on which a camera or the like is mounted and which can automatically rotate the camera or the like in any direction by remote operation and can position the camera or the like is known.

Heretofore, in this known automatic universal head, a control circuit as shown in FIG. 3 of the accompanying drawings (i.e., a position servo mechanism) has been provided for a motor for rotating the universal head. In FIG. 3, reference numeral 1 designates a motor driving circuit for controlling the voltage and current of the motor M, reference numeral 2 denotes a position detector such as a potentiometer which generates a position detection signal corresponding to the rotated position (the angle of rotation) of the universal head (not shown), reference numeral 3 designates a position instruction signal generator which generates a position instruction signal for rotating the universal head to any rotated position, and reference numeral 4 denotes a position difference signal detector which generates the difference between the output signal of the position detector 2 and the position instruction signal (i.e., the position difference signal) as an output signal and controls the motor driving circuit 1.

In the conventional automatic universal head having the control circuit as described above, the applied voltage and supplied current to the motor M are controlled by the difference between the output signal of the position detector 2 and the position instruction signal (i.e., the position difference detection signal) and therefore, when the motor M is started (that is, when the universal head is started), the difference between the position instruction signal and the output signal of the position detector 2 becomes greatest and thus, a great applied voltage and a great current are supplied to the motor M, which is thus started with the maximum torque thereof.

Now, in the automatic universal head as described above, if extraneous tension is applied to the camera cable of a camera mounted on the universal head or if a telephoto lens is mounted on the camera and the center of composite gravity of the camera and the telephoto lens is not coincident with the tilt rotation axis, the load torque of the universal head will become remarkably great. Furthermore even if a position instruction signal is put out from the position instruction signal generator 3, the motor M for rotating the universal head will not be started and there may occur a situation in which said great voltage and said great current continue to be applied to the field winding and armature winding of the motor M. If the automatic universal head is remote-operated, the operator is far from the universal head and therefore, even if such a situation occurs, the operator often cannot cope with the situation quickly and accordingly, an accident such as the motor burning up is possible.

However, in the conventional automatic universal head as described above, there is no function of preventing the occurrence of the situation as previously described and thus, in the case as described above, there has been the danger of the motor being burnt up.

SUMMARY OF THE INVENTION

In an embodiment of the present invention, it is intended to provide a universal head in which the power supply to a motor is automatically cut off when a predetermined time elapses after the operator has designated the position relative to a controlled member, whereby the above-noted problems are eliminated.

In an embodiment of the present invention, it is intended to provide a universal head in which when the operator designates the position relative to a controlled member, a designated position signal is formed and the position signal is delayed and the coincidence between the delayed position signal and the designated position signal is detected and a motor is driven until the detection of the coincidence is done, whereby the controlled member is moved to the designated position and after the coincidence is detected, the motor is stopped irrespective of the movement of the controlled member, whereby the above-noted problems are eliminated.

Other objects of the present invention will become apparent from the following description of some embodiments thereof taken in conjuction with the accompanying drawings.

BRIEF DESCRIPTION OF THE DRAWINGS

FIG. 1 is a block diagram showing an embodiment of the automatic universal head according to the present invention.

FIG. 2 is a block diagram showing another embodiment of the present invention.

DESCRIPTION OF THE PREFERRED EMBODIMENTS

Figure 3:
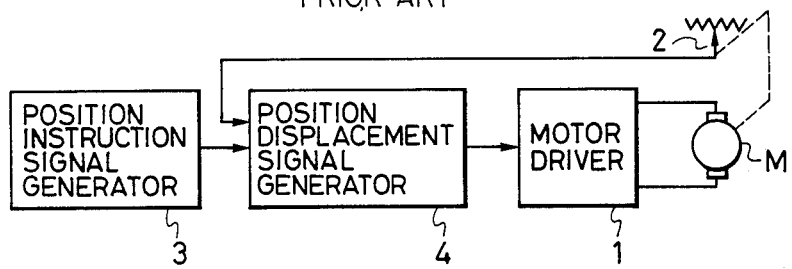
FIG. 3 is a block diagram showing a universal head according to the prior art.

Two embodiments of the present invention will hereinafter be described with reference to FIGS. 1 and 2. In FIGS. 1 and 2, portions designated by reference numerals similar to those in FIG. 3 are similar to the portions of the conventional apparatus and therefore need not be described.

FIG. 1 is a block diagram showing a first embodiment of the present invention. In FIG. 1, reference numeral 5 designates a safety circuit. In the present embodiment, the safety circuit 5 is comprised of a delay circuit 6 and a window comparator 7. The delay circuit 6 is a circuit for introducing thereinto the first (of the preceding) position instruction signal generated by a position instructior signal generator 3 and delaying the same signal for a predetermined time, and putting it out as a delay position instruction signal.

On the other hand, the output of the position instruction signal generator 3 and the output of the delay circuit 6 may be input to the window comparator 7. When the input from the delay circuit 6 (i.e., the preceding position instruction signal) and the input from the position instruction signal generator 3 (i.e., the succeeding position instruction signal) are coincident with each other, the window comparator 7 applies a gate signal representative of the coincidence to a motor driving circuit 1 and nullifies the gain of the motor driving circuit 1 to thereby cut off the power supply to a motor M, and when the input from the delay circuit 6 and the input from the position instruction signal generator 3 are not coincident with each other, the window comparator 7 applies a gate signal representative of the incoincidence to the motor driving circuit 1. The motor driving circuit 1 is designed such that the gain thereof is changed by only the gate signal representative of said coincidence which is generated by the window comparator 7. (In the ensuing description, the output of the window comparator 7 when the inputs to the window comparator 7 are coincident with each other will be referred to as the coincidence signal, and the output of the window comparator 7 when said inputs are not coincident will be referred to as the incoincidence signal.)

Accordingly, in the present embodiment, the first position instruction signal generated by the position instruction signal generator 3 and the next position instruction signal generated later are compared with each other by the window comparator 7 and, when the two signals are coincident with each other, the gain of the motor driving circuit 1 is nullified by the coincidence signal applied from the window comparator 7 to the motor driving circuit 1 and as a result, the power supply to the motor M is cut off.

With such a construction, when the operator operates the operating portion of the position instruction signal generator and designates a desired position, a position instruction signal of a value representative of the designated position is input to one input end of the comparator 7. This position instruction signal is also input to the delay circuit 6, and this circuit transmits the input signal, i.e., the position instruction signal of the value designated by the operator, to the output end thereof after a predetermined time of delay. Consequently, for said delay time, the values of the two input signals of the comparator are not coincident with each other and the comparator 7 puts out the incoincidence signal for said delay time after the operator has designated a desired position, and transmits the same signal to the motor driving circuit 1 and renders the circuit 1 operative for said time. On the other hand, the position instruction signal representative of the designated position from the position instruction signal generator 3 is input to a position displacement detector 4 and therefore, the detector 4 puts out a difference signal with respect to the position detector 2 representative of the current position of the controlled member of the universal head, and transmits the same signal to the motor driving circuit 1, which thus drives the motor M in response to said difference signal to thereby shift the controlled member to the designated position.

During the normal time, the apparatus operates as described above and the controlled member is shifted to the designated position, but when the controlled member of the universal head is caught by a camera cable or the like or when the load torque is remarkably large, even if the position difference signal is supplied from the position difference detector 4 to the motor driving circuit as described above, the motor will not revolve. Even in such a state, in the present embodiment, the output of the delay circuit 6 becomes equal in value to the position instruction signal of the position instruction signal generator 3 in the delay time by the delay circuit 6 after the operator operates the operating member of the position instruction signal generator 3 as described above and a position instruction signal of a desired value is put out from the generator 3, and the output of the comparator 7 changes from the incoincidence signal to the coincidence signal and therefore, the gain of the motor driving circuit 1 becomes zero and as a result, the power supply to the motor M is cut off. Consequently, the inconvenience that the power supply to the motor M is continued even in the case as described above can be prevented.

The delay time of the delay circuit 6 is normally set to a time longer than the time required for the controlled member to be displaced to the designated position.

FIG. 2 shows a modification of the FIG. 1 embodiment. The safety circuit 5 in this modification comprises a monostable multivibrator 8 connected to the output end of the window comparator 7 in the embodiment of FIG. 1. The monostable multivibrator 8 is adapted to be triggered by said incoincidence signal of the output of the window comparator 7, and after it is triggered once, it maintains its output (high level) for a predetermined time and as a result, the power supply to the motor M is kept for a predetermined time, whereafter the output is inverted to a low level and therefore, the gain of the motor driving circuit 1 becomes zero and the power supply to the motor M is stopped. In the FIG. 2 embodiment constructed like this, after the operator's operation of setting the designated position has been done, the motor driving circuit 1 becomes operative for a time controlled by the monostable multivibrator 8, and within this time, the shift of the controlled member to the designated position is accomplished by the operation described in connection with FIG. 1. Also, when the controlled member of the universal head is not driven even if said operator's setting operation is done, the power supply to the motor M is cut off after the time controlled by said monostable multivibrator and therefore, as in the embodiment of FIG. 1, the power supply to the motor M being continued for an indefinite time is prevented. The time during which the high level signal of the monostable multivibrator is put out is set to a time longer than the delay time of the delay circuit 6 and therefore, even if the comparator 7 puts out the coincidence signal after the delay time of the delay circuit 6, the power supply to the motor M is not immediately cut off and further, the power supply to the motor M is cut off after the lapse of a predetermined time. Consequently, the response delay of the mechanical system which is the problem when the delay time of the delay circuit 6 is made substantially coincident with the shift time of the controlled member can also be compensated for.

Figure 4A:
FIGS. 4A, 4B, 4C and 4D are circuit diagrams showing the constructions of the respective blocks in FIGS. 1 and 2.
Figure 4B:
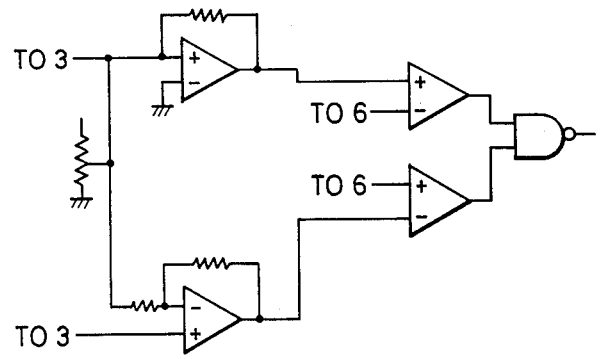
Figure 4C:
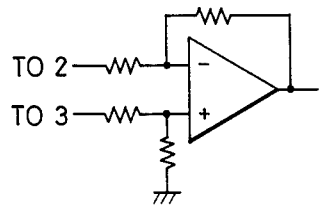
Figure 4D:
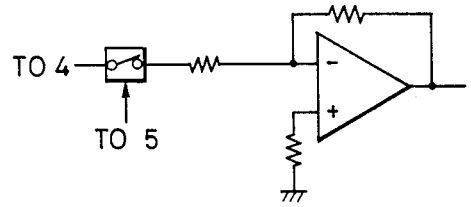

The blocks 1, 3, 4, 6 and 7 in FIGS. 1 and 2 are conventional, and specifically, the position instruction signal generator 3 is comprised of a potentiometer as shown in FIG. 4A and the comparator 7 is comprised of an amplifier and a NAND gate as shown in FIG. 4B. In FIG. 4B, a predetermined value is added to or subtracted from the output from the generator 3 and, when the output of the delay circuit 6 has entered into this signal range, the NAND gate puts out a low level signal as the coincidence signal. Also, the position difference detector 4 is comprised of a differential amplifier as shown in FIG. 4C, and the motor driving circuit 1 is comprised of an amplifier and an analog switch as shown in FIG. 4D. This analog switch is adapted to be opened and nullify the gain of the amplifier when the output of the safety circuit 5 is at a low level.

Although the safety circuit 5 has been shown as using the delay circuit 6 and the window comparator 7, the safety circuit may be comprised of a differentiation circuit instead of the delay circuit 6 and the window comparator 7 and the monostable multivibrator may be triggered by a differentiation output.

Also, only an example in which the gain of the motor driving circuit 1 is changed has been shown, but design may be made such that the gain of the position difference signal detector is changed.

Further, in the above-described embodiment, a case where the gain of the motor driving circuit is varied to cut off the power supply to the motor M has been shown, but an electromagnetic switch may be provided in the power supply circuit of the motor M so that the power supply circuit may be directly opened in response to the output of the safety circuit 5 through the electromagnetic switch.

Also, where the present invention is applied to a similar control system designed such that the operation of a control signal such as a position instruction is effected by a microcomputer, a memory for temporarily storing the position instruction data may be provided and system design may be made such that the position instruction data read out from the memory is used as the preceding output data.

As described above, the automatic universal head of the present invention is designed such that the preceding position instruction signal put out from the position instruction signal generator is compared with the succeeding position instruction signal and the power supply to the motor is switched on or off in conformity with the coincidence or incoincidence between the two signals and therefore, occurrence of a dangerous state in which the power supply to the motor continues in spite of the universal head not being rotated can be obviated. Thus according to the present invention, there is provided an automatic universal head which is free of the undesirable possibility of causing accidents such as the overheating of the transistors in the motor driving circuit and the burning of the motor.

I claim:

1. A universal head for mounting a camera and rotating the camera in a designated direction comprising:
   (a) motor means for rotating the camera;
   (b) position detecting means for detecting a rotating position of the camera, and for outputting a position signal of the camera;
   (c) an instruction signal generator for setting a rotating position where the camera should be rotated, and for generating a position instruction signal to be instructed;
   (d) a difference signal generator for generating a difference signal concerning a difference between the position signal and the position instruction signal to supply power to said motor means;
   (e) delay circuit means for outputting a delay signal which is made by delaying the position instruction signal for a predetermined time; and
   (f) a comparator for outputting a coincident signal when the position instruction signal coincides with the delay signal and prohibiting the difference signal from being supplied to said motor means.

* * * * *

UNITED STATES PATENT AND TRADEMARK OFFICE
CERTIFICATE OF CORRECTION

PATENT NO. : 4,767,974
DATED : August 30, 1988
INVENTOR(S) : Tsuneaki Kadosawa

It is certified that error appears in the above-identified patent and that said Letters Patent is hereby corrected as shown below:

COLUMN 1

Line 55, "Furthermore" should read --Furthermore,--.

COLUMN 2

Line 56, "structior" should read --struction--.

COLUMN 4

Line 14, "modificaticn" should read --modification--.

COLUMN 6

Line 5, "Thus" should read --Thus,--.

Signed and Sealed this

Fourth Day of July, 1989

Attest:

DONALD J. QUIGG

Attesting Officer

Commissioner of Patents and Trademarks